(12) United States Patent
Barsness et al.

(10) Patent No.: US 9,244,662 B2
(45) Date of Patent: *Jan. 26, 2016

(54) OPTIMIZING JUST-IN-TIME COMPILING FOR A JAVA APPLICATION EXECUTING ON A COMPUTE NODE

(71) Applicant: INTERNATIONAL BUSINESS MACHINES CORPORATION, Armonk, NY (US)

(72) Inventors: Eric L. Barsness, Pine Island, MN (US); David L. Darrington, Rochester, MN (US); Amanda E. Randles, Cambridge, MA (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 33 days.

This patent is subject to a terminal disclaimer.

(21) Appl. No.: 13/767,983

(22) Filed: Feb. 15, 2013

(65) Prior Publication Data

US 2013/0159983 A1 Jun. 20, 2013

Related U.S. Application Data

(63) Continuation of application No. 12/109,271, filed on Apr. 24, 2008, now Pat. No. 8,397,225, and a continuation of application No. 13/685,792, filed on Nov. 27, 2012.

(51) Int. Cl.
G06F 9/44 (2006.01)
G06F 9/45 (2006.01)
G06F 9/455 (2006.01)

(52) U.S. Cl.
CPC .............. G06F 8/41 (2013.01); G06F 9/45516 (2013.01)

(58) Field of Classification Search
CPC .................................................. G06F 9/45516
USPC ........................................................ 717/148
See application file for complete search history.

(56) References Cited

U.S. PATENT DOCUMENTS 6,011,918 A 1/2000 Cohen et al.
6,199,196 B1 3/2001 Madany et al.
6,202,208 B1 3/2001 Holiday (Continued)

OTHER PUBLICATIONS

Kielmann et al., Enabling Java for High-Performance Computing, Communications of the ACM, vol. 44, No. 10, pp. 110-117 (Oct. 2001.*

(Continued)

*Primary Examiner* — Don Wong
*Assistant Examiner* — Theodore Hebert
(74) *Attorney, Agent, or Firm* — Edward J. Lenart; Grant A. Johnson; Kennedy Lenart Spraggins LLP

(57) ABSTRACT

Methods, systems, and products are disclosed for optimizing just-in-time ('JIT') compiling for a Java application executing on a compute node, the compute node having installed upon it a Java Virtual Machine ('JVM') capable of supporting the Java application, that include: identifying, by an application manager, a particular portion of the Java application; assigning, by the application manager, a JIT level to the particular portion of the Java application; and jitting, by the JVM installed on the compute node, the particular portion of the Java application in dependence upon the JIT level assigned to that particular portion of the Java application.

5 Claims, 7 Drawing Sheets

(56) References Cited

U.S. PATENT DOCUMENTS

| | | |
|---|---|---|
| 6,295,643 B1 | 9/2001 | Brown et al. |
| 6,618,737 B2 | 9/2003 | Aridor et al. |
| 6,658,479 B1 | 12/2003 | Zaumen et al. |
| 6,718,540 B1 | 4/2004 | Azua et al. |
| 6,735,761 B1 * | 5/2004 | Ogasawara .......... 717/140 |
| 6,738,977 B1 | 5/2004 | Berry et al. |
| 6,779,030 B1 | 8/2004 | Dugan et al. |
| 6,842,759 B2 | 1/2005 | Haggar et al. |
| 7,100,199 B2 | 8/2006 | Ginter et al. |
| 7,197,565 B2 | 3/2007 | Abdelaziz et al. |
| 7,209,964 B2 | 4/2007 | Dugan et al. |
| 7,254,608 B2 | 8/2007 | Yeager et al. |
| 7,272,815 B1 | 9/2007 | Eldridge et al. |
| 7,302,609 B2 | 11/2007 | Matena et al. |
| 7,395,536 B2 | 7/2008 | Verbeke et al. |
| 7,555,566 B2 | 6/2009 | Blumrich et al. |
| 7,587,712 B2 * | 9/2009 | Mountain et al. .......... 717/148 |
| 7,627,658 B2 | 12/2009 | Levett et al. |
| 7,685,577 B2 | 3/2010 | Pace et al. |
| 7,703,089 B2 | 4/2010 | Birenheide |
| 7,827,566 B2 | 11/2010 | Svetoslavov et al. |
| 7,844,835 B2 | 11/2010 | Ginter et al. |
| 7,844,960 B2 * | 11/2010 | Inglis et al. .......... 717/153 |
| 2003/0037173 A1 | 2/2003 | Pace et al. |
| 2003/0041141 A1 | 2/2003 | Abdelaziz et al. |
| 2004/0015911 A1 | 1/2004 | Hinsley et al. |
| 2004/0088348 A1 | 5/2004 | Yeager et al. |
| 2004/0088646 A1 | 5/2004 | Yeager et al. |
| 2004/0098447 A1 | 5/2004 | Verbeke et al. |
| 2004/0111302 A1 | 6/2004 | Falk et al. |
| 2004/0162871 A1 | 8/2004 | Pabla et al. |
| 2005/0005200 A1 | 1/2005 | Matena et al. |
| 2005/0021713 A1 | 1/2005 | Dugan et al. |
| 2005/0086300 A1 | 4/2005 | Yeager et al. |
| 2005/0256907 A1 | 11/2005 | Novik et al. |
| 2006/0167887 A1 | 7/2006 | Galchev |
| 2006/0206884 A1 * | 9/2006 | Creamer et al. .......... 717/147 |
| 2007/0220522 A1 | 9/2007 | Coene et al. |
| 2007/0226697 A1 | 9/2007 | Barsness et al. |
| 2008/0005547 A1 | 1/2008 | Papakipos et al. |
| 2009/0125611 A1 | 5/2009 | Barsness et al. |
| 2009/0125883 A1 | 5/2009 | Barsness et al. |
| 2009/0271775 A1 | 10/2009 | Barsness et al. |
| 2013/0091496 A1 | 4/2013 | Barsness et al. |
| 2013/0159983 A1 * | 6/2013 | Barsness et al. .......... 717/148 |

OTHER PUBLICATIONS

Ishizaki et al., Effectiveness of Cross-Platform Optimizations for a Java Just-In-Time Compiler, IBM Research (2003) retrieved from http://citeseerx.ist.psu.edu/viewdoc/download;jsessionid=ED2633772686E2C23FC5A424B93B1EFD?doi=10.1.1.331.8390&rep=rep1&type=pdf on Feb. 7, 2015.*

Kielmann et al., Enabling Java for High-Performance Computing, Communications of the ACM, vol. 44, No. 10, pp. 110-117 (Oct. 2001).*

Kniesel et al., "JMangler—A Framework for Load-Time Transformation of Java Class Files", Proceedings, First IEEE International Workshop on Source Code Analysis and Manipulation, Nov. 2001, pp. 98-108, DOI: 10.1109/SCAM.2001.972671, IEEE, USA.

Gong, "Secure Java Class Loading", Journal, IEEE Internet Computing, Nov. 1998, pp. 56-61, vol. 2, Issue 6, IEEE Educational Activities Department Piscataway, NJ, USA.

* cited by examiner

OPTIMIZING JUST-IN-TIME COMPILING FOR A JAVA APPLICATION EXECUTING ON A COMPUTE NODE

CROSS-REFERENCE TO RELATED APPLICATION

This application is a continuation application of and claims priority from U.S. patent application Ser. No. 12/109,271, filed on Apr. 24, 2008 and U.S. patent application Ser. No. 13/685,792, filed on Nov. 27, 2012.

BACKGROUND OF THE INVENTION

1. Field of the Invention

The field of the invention is data processing, or, more specifically, methods, apparatus, and products for optimizing just-in-time ('JIT') compiling for a Java application executing on a compute node.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x,y,z coordinate in the mesh. A torus network lends itself to point to point operations. In a tree network, the nodes typically are connected into a binary tree: each node has a parent, and two children (although some nodes may only have zero children or one child, depending on the hardware configuration). In computers that use a torus and a tree network, the two networks typically are implemented independently of one another, with separate routing circuits, separate physical links, and separate message buffers. A tree network provides high bandwidth and low latency for certain collective operations, message passing operations where all compute nodes participate simultaneously, such as, for example, an allgather.

The parallel applications that execute on the nodes in the data communications networks may be implemented in a variety of software programming languages, including the various versions and derivatives of Java™ technology promulgated by Sun Microsystems. Java applications generally run in a virtual execution environment called the Java Virtual Machine ('JVM'), rather than running directly on the computer hardware. The Java application is typically compiled into byte-code form, and then compiled in a just-in-time ('JIT') manner, or on-the-fly, by the JVM into JIT code representing hardware commands specific to the hardware platform on which the JVM is installed.

SUMMARY OF THE INVENTION

Methods, systems, and products are disclosed for optimizing just-in-time ('JIT') compiling for a Java application executing on a compute node, the compute node having installed upon it a Java Virtual Machine ('JVM') capable of supporting the Java application, that include: identifying, by an application manager, a particular portion of the Java application; assigning, by the application manager, a JIT level to the particular portion of the Java application; and jitting, by the JVM installed on the compute node, the particular portion of the Java application in dependence upon the JIT level assigned to that particular portion of the Java application.

The foregoing and other objects, features and advantages of the invention will be apparent from the following more

DETAILED DESCRIPTION OF EXEMPLARY EMBODIMENTS

Figure 1:
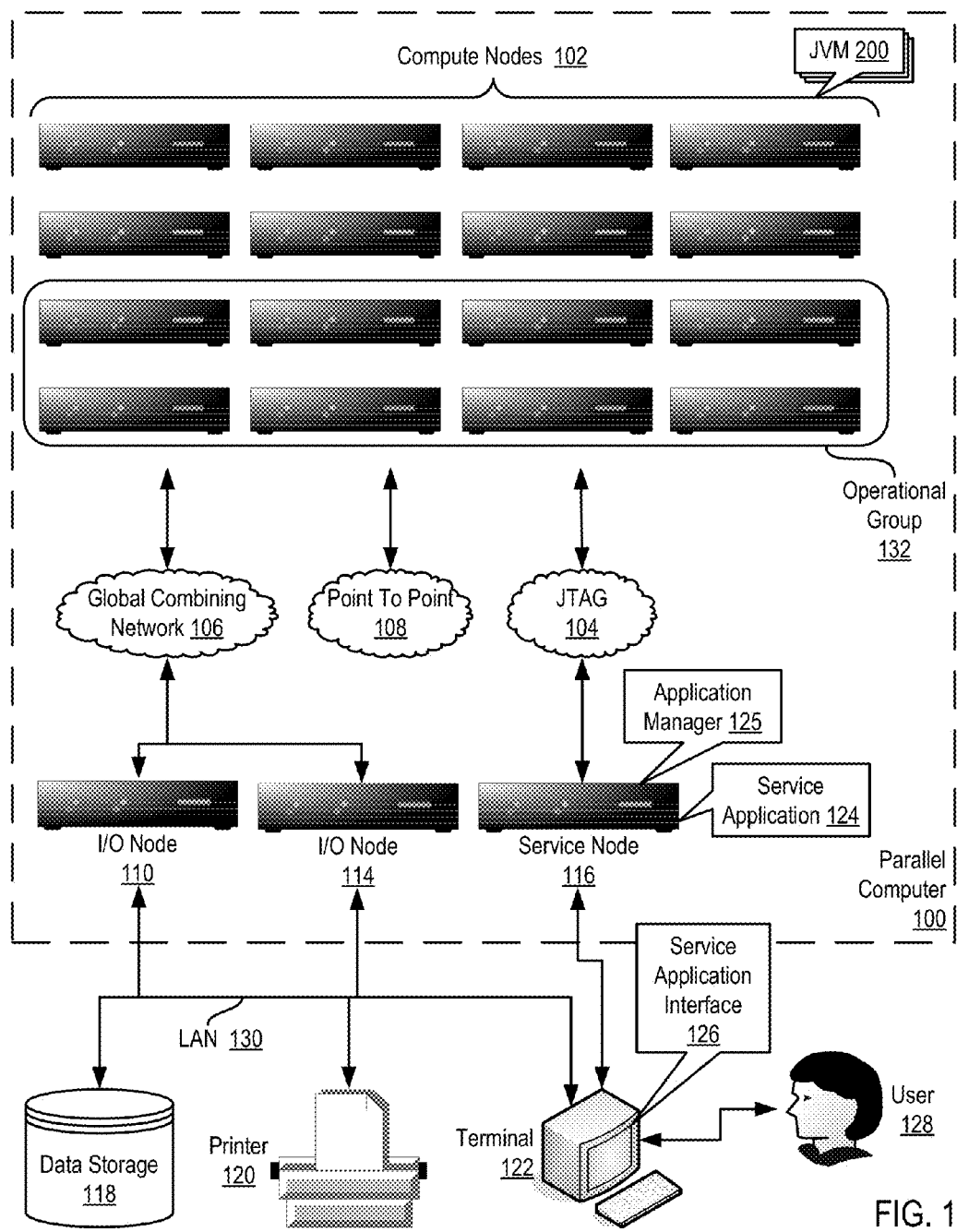
FIG. 1 illustrates an exemplary system for optimizing JIT compiling for a Java application executing on a compute node according to embodiments of the present invention.

Exemplary methods, apparatus, and computer program products for optimizing JIT compiling for a Java application executing on a compute node according to embodiments of the present invention are described with reference to the accompanying drawings, beginning with FIG. 1. FIG. 1 illustrates an exemplary system for optimizing JIT compiling for a Java application executing on a compute node according to embodiments of the present invention. The system of FIG. 1 includes a parallel computer (100), non-volatile memory for the computer in the form of data storage device (118), an output device for the computer in the form of printer (120), and an input/output device for the computer in the form of computer terminal (122). Parallel computer (100) in the example of FIG. 1 includes a plurality of compute nodes (102).

The compute nodes (102) are coupled for data communications by several independent data communications networks including a Joint Test Action Group ('JTAG') network (104), a global combining network (106) which is optimized for collective operations, and a torus network (108) which is optimized point to point operations. The global combining network (106) is a data communications network that includes data communications links connected to the compute nodes so as to organize the compute nodes as a tree. Each data communications network is implemented with data communications links among the compute nodes (102). The data communications links provide data communications for parallel operations among the compute nodes of the parallel computer. The links between compute nodes are bi-directional links that are typically implemented using two separate directional data communications paths.

In addition, the compute nodes (102) of parallel computer are organized into at least one operational group (132) of compute nodes for collective parallel operations on parallel computer (100). An operational group of compute nodes is the set of compute nodes upon which a collective parallel operation executes. Collective operations are implemented with data communications among the compute nodes of an operational group. Collective operations are those functions that involve all the compute nodes of an operational group. A collective operation is an operation, a message-passing computer program instruction that is executed simultaneously, that is, at approximately the same time, by all the compute nodes in an operational group of compute nodes. Such an operational group may include all the compute nodes in a parallel computer (100) or a subset all the compute nodes. Collective operations are often built around point to point operations. A collective operation requires that all processes on all compute nodes within an operational group call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group. An operational group may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use with systems according to embodiments of the present invention include MPI and the 'Parallel Virtual Machine' ('PVM') library. PVM was developed by the University of Tennessee, The Oak Ridge National Laboratory, and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group. For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

In a scatter operation, the logical root divides data on the root into segments and distributes a different segment to each compute node in the operational group. In scatter operation, all processes typically specify the same receive count. The send arguments are only significant to the root process, whose buffer actually contains sendcount*N elements of a given data type, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduce operation is also a many-to-one collective operation that includes an arithmetic or logical function performed on two data elements. All processes specify the same 'count' and the same arithmetic or logical function. After the reduction, all processes have sent count data elements from computer node send buffers to the root process. In a reduction operation, data elements from corresponding send buffer locations are combined pair-wise by arithmetic or logical operations to yield a single corresponding element in the root process's receive buffer. Application specific reduction operations can be defined at runtime. Parallel communications libraries may support predefined operations. MPI, for example, provides the following predefined reduction operations:

| | |
|---|---|
| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

In addition to compute nodes, the parallel computer (100) includes input/output ('I/O') nodes (110, 114) coupled to compute nodes (102) through the global combining network (106). The compute nodes in the parallel computer (100) are partitioned into processing sets such that each compute node in a processing set is connected for data communications to the same I/O node. Each processing set, therefore, is composed of one I/O node and a subset of compute nodes (102). The ratio between the number of compute nodes to the number of I/O nodes in the entire system typically depends on the hardware configuration for the parallel computer. For example, in some configurations, each processing set may be composed of eight compute nodes and one I/O node. In some other configurations, each processing set may be composed of sixty-four compute nodes and one I/O node. Such example are for explanation only, however, and not for limitation. Each I/O nodes provide I/O services between compute nodes (102) of its processing set and a set of I/O devices. In the example of FIG. 1, the I/O nodes (110, 114) are connected for data communications I/O devices (118, 120, 122) through local area network ('LAN') (130) implemented using high-speed Ethernet.

The parallel computer (100) of FIG. 1 also includes a service node (116) coupled to the compute nodes through one of the networks (104). Service node (116) provides services common to pluralities of compute nodes, administering the configuration of compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

In the example of FIG. 1, the service node (116) has installed upon it an application manager (125). The application manager (125) of FIG. 1 includes a set of computer program instructions capable of optimizing JIT compiling for a Java application executing on a compute node according to embodiments of the present invention. The application manager (125) operates generally for optimizing JIT compiling for a Java application executing on a compute node according to embodiments of the present invention by: identifying particular portion of the Java application and assigning a JIT level to the particular portion of the Java application. Although FIG. 1 illustrates the application manager (125) installed on a service node, readers will note that such an example is for explanation only and not for limitation. An application manager is a software component that may be installed on any compute nodes or other computer as will occur to those of skill in the art.

Each compute node (102) of FIG. 1 has installed upon it a Java Virtual Machine ('JVM') (200) capable of supporting a Java application. Each JVM (200) of FIG. 1 includes a set of computer program instructions capable of optimizing JIT compiling for a Java application executing on a compute node according to embodiments of the present invention. Each JVM (200) operates generally for optimizing JIT compiling for a Java application executing on a compute node according to embodiments of the present invention by jitting a particular portion of a Java application in dependence upon the JIT level assigned to that particular portion of the Java application. The term 'Sitting' refers to the process of translating byte code into native platform machine code executable on the platform's processor and optimizing the machine code for enhanced execution performance.

A JIT level, also referred to as a 'HT mode,' specifies the type of JIT compiling and optimizations performed on a particular portion of a Java application. The number and type of JIT levels available for a JVM vary from one implementation to another. For one example, Sun Microsystems' JVM has two major JIT levels—client and server. In the client JIT level, minimal compilation and optimization is performed in an effort to reduce the startup time required for the application to begin executing. In the server JIT level, initial startup time is sacrificed, and extensive compilation and optimization is performed to maximize application performance when the application executes. Readers will note that these two JIT level are for example and explanation only and not for limitations. Other JIT levels and other terms besides 'client' and 'server' may be used to identify JIT level as will occur to those of skill in the art.

In the example of FIG. 1, the plurality of compute nodes (102) are implemented in a parallel computer (100) and are connected together using a plurality of data communications networks (104, 106, 108). The point to point network (108) is optimized for point to point operations. The global combining network (106) is optimized for collective operations. Although optimizing JIT compiling for a Java application executing on a compute node according to embodiments of the present invention is described above in terms of optimizing JIT compiling for a Java application executing on a parallel computer, readers will note that such an embodiment is for explanation only and not for limitation. In fact, optimizing JIT compiling for a Java application executing on a compute node according to embodiments of the present invention may be implemented using a variety of computer systems composed of a plurality of nodes network-connected together, including for example a cluster of nodes, a distributed computing system, a grid computing system, and so on.

The arrangement of nodes, networks, and I/O devices making up the exemplary system illustrated in FIG. 1 are for explanation only, not for limitation of the present invention. Data processing systems capable of optimizing JIT compiling for a Java application executing on a compute node according to embodiments of the present invention may include additional nodes, networks, devices, and architectures, not shown in FIG. 1, as will occur to those of skill in the art. Although the parallel computer (100) in the example of FIG. 1 includes sixteen compute nodes (102), readers will note that parallel computers capable of optimizing JIT compiling for a Java application executing on a compute node according to embodiments of the present invention may include any number of compute nodes. In addition to Ethernet and JTAG, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Optimizing JIT compiling for a Java application executing on a compute node according to embodiments of the present invention may be generally implemented on a parallel computer that includes a plurality of compute nodes, among other types of exemplary systems. In fact, such computers may include thousands of such compute nodes. Each compute node is in turn itself a kind of computer composed of one or more computer processors, its own computer memory, and its own input/output adapters. For further explanation, therefore, FIG. 2 sets forth a block diagram of an exemplary compute node (152) useful in a parallel computer capable of optimizing JIT compiling for a Java application executing on a compute node according to embodiments of the present invention.

Figure 2:
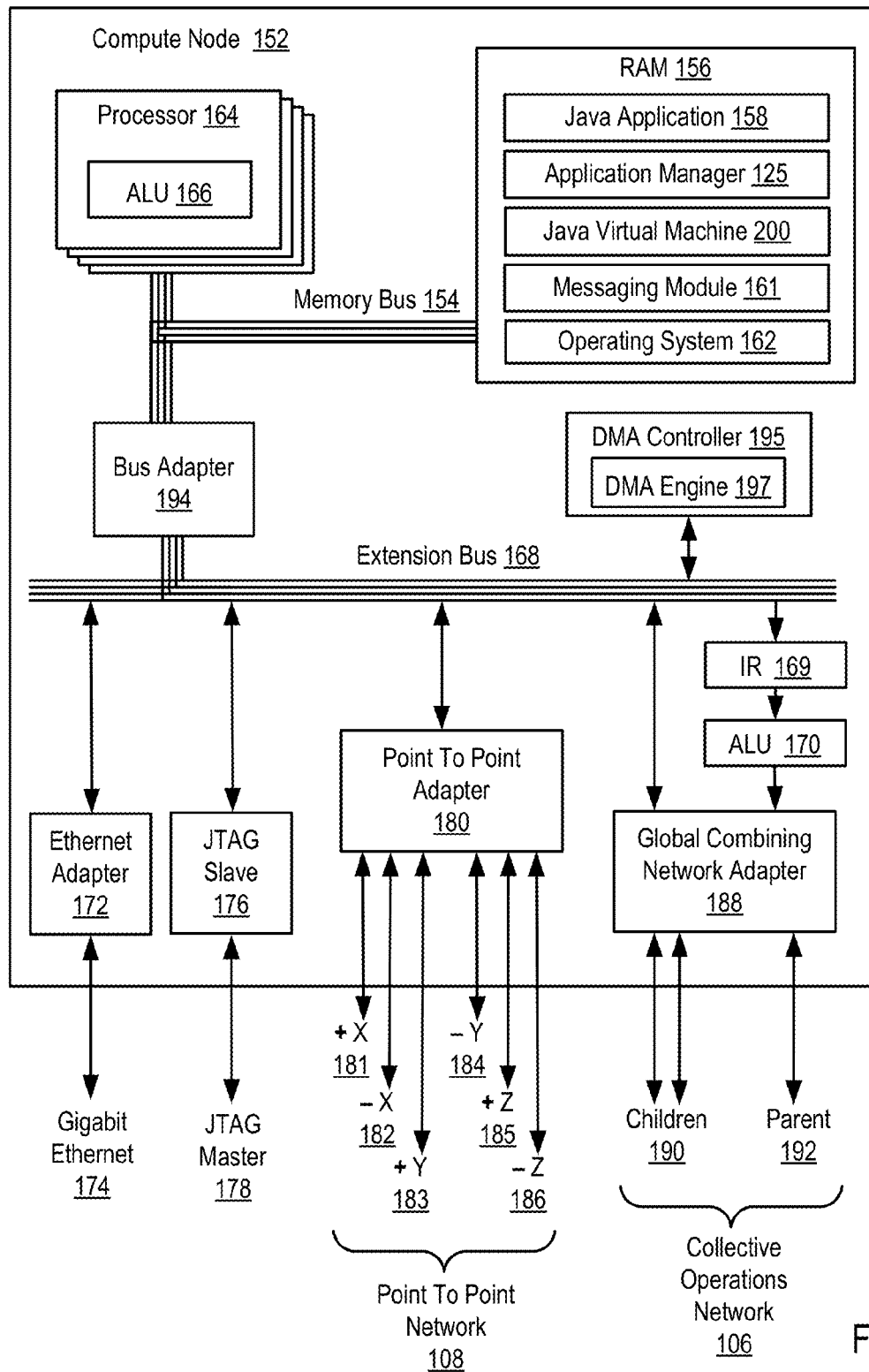
FIG. 2 sets forth a block diagram of an exemplary compute node useful in a parallel computer capable of optimizing JIT compiling for a Java application executing on a compute node according to embodiments of the present invention.

The compute node (152) of FIG. 2 includes one or more computer processors (164) as well as random access memory ('RAM') (156). The processors (164) are connected to RAM (156) through a high-speed memory bus (154) and through a bus adapter (194) and an extension bus (168) to other components of the compute node (152). Stored in RAM (156) is a Java application (158), a module of computer program instructions that carries out parallel, user-level data processing using one or more Java classes.

Also stored in RAM (156) is an application manager (125). The application manager (125) of FIG. 2 includes a set of computer program instructions capable of optimizing JIT compiling for a Java application executing on a compute node according to embodiments of the present invention. The application manager (125) operates generally for optimizing JIT compiling for a Java application executing on a compute node according to embodiments of the present invention by: identifying particular portion of the Java application (158) and assigning a JIT level to the particular portion of the Java application (158).

Also stored in RAM (156) is a Java Virtual Machine ('JVM') (200). The JVM (200) of FIG. 2 is a set of computer software programs and data structures which implements a virtual execution environment for a specific hardware platform. The JVM (200) of FIG. 2 accepts the Java application (158) for execution in a computer intermediate language, commonly referred to as Java byte code, which is a hardware-independent compiled form of the Java application (158). In such a manner, the JVM (200) of FIG. 2 serves to abstract the compiled version of the Java application (158) from the hardware of node (152) because the JVM (200) handles the hardware specific implementation details of executing the application (158) during runtime. Abstracting the hardware details of a platform from the compiled form of a Java application allows the application to be compiled once into byte code, yet run on a variety of hardware platforms.

The JVM (200) of FIG. 2 is improved for optimizing JIT compiling for a Java application executing on a compute node according to embodiments of the present invention. The JVM (200) of FIG. 2 operates generally for optimizing JIT compiling for a Java application executing on a compute node according to embodiments of the present invention by: jitting a particular portion of a Java application in dependence upon the JIT level assigned to that particular portion of the Java application (158).

Also stored RAM (156) is a messaging module (161), a library of computer program instructions that carry out parallel communications among compute nodes, including point to point operations as well as collective operations. The Java application (158) effects data communications with other applications running on other compute nodes by calling software routines in the messaging modules (161). A library of parallel communications routines may be developed from scratch for use in systems according to embodiments of the present invention, using a traditional programming language such as the C programming language, and using traditional programming methods to write parallel communications routines. Alternatively, existing prior art libraries may be used such as, for example, the 'Message Passing Interface' ('MPI') library, the 'Parallel Virtual Machine' ('PVM') library, and the Aggregate Remote Memory Copy Interface ('ARMCI') library.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (152) of FIG. 2, another factor that decreases the demands on the operating system. The operating system may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Microsoft Vista™, AIX™, IBM's i5/OS™, and others as will occur to those of skill in the art.

The exemplary compute node (152) of FIG. 2 includes several communications adapters (172, 176, 180, 188) for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in systems for optimizing JIT compiling for a Java application executing on a compute node according to embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (152) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 includes a JTAG Slave circuit (176) that couples example compute node (152) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 2 may be all three of these: It typically includes one or more integrated circuits installed on a printed circuit board and may be implemented as an embedded system having its own processor, its own memory, and its own I/O capability. JTAG boundary scans through JTAG Slave (176) may efficiently configure processor registers and memory in compute node (152) for use in optimizing JIT compiling for a Java application executing on a compute node according to embodiments of the present invention.

The data communications adapters in the example of FIG. 2 includes a Point To Point Adapter (180) that couples example compute node (152) for data communications to a network (108) that is optimal for point to point message passing operations such as, for example, a network configured as a three-dimensional torus or mesh. Point To Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 includes a Global Combining Network Adapter (188) that couples example compute node (152) for data communications to a network (106) that is optimal for collective message passing operations on a global combining network configured, for example, as a binary tree. The Global Combining Network Adapter (188) provides data communications through three bidirectional links: two to children nodes (190) and one to a parent node (192).

Example compute node (152) includes two arithmetic logic units ('ALUs'). ALU (166) is a component of processor (164), and a separate ALU (170) is dedicated to the exclusive use of Global Combining Network Adapter (188) for use in performing the arithmetic and logical functions of reduction operations. Computer program instructions of a reduction routine in parallel communications library (160) may latch an instruction for an arithmetic or logical function into instruction register (169). When the arithmetic or logical function of a reduction operation is a 'sum' or a 'logical or,' for example, Global Combining Network Adapter (188) may execute the arithmetic or logical operation by use of ALU (166) in processor (164) or, typically much faster, by use dedicated ALU (170).

The example compute node (152) of FIG. 2 includes a direct memory access ('DMA') controller (195), which is computer hardware for direct memory access and a DMA engine (195), which is computer software for direct memory access. Direct memory access includes reading and writing to memory of compute nodes with reduced operational burden on the central processing units (164). A DMA transfer essentially copies a block of memory from one compute node to another. While the CPU may initiates the DMA transfer, the CPU does not execute it. In the example of FIG. 2, the DMA engine (195) and the DMA controller (195) support the messaging module (161).

Figure 3A:
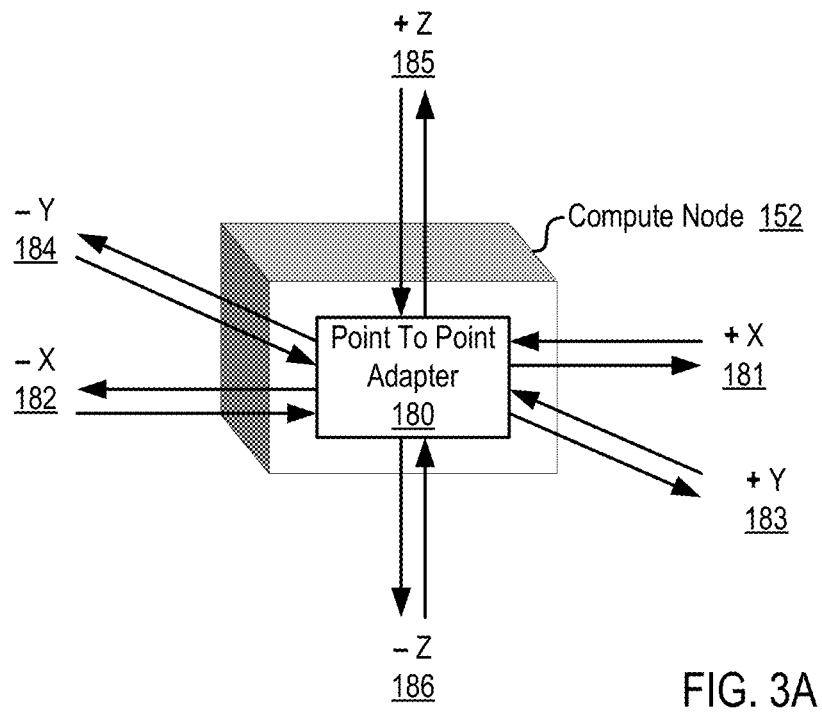
FIG. 3A illustrates an exemplary Point To Point Adapter useful in systems capable of optimizing JIT compiling for a Java application executing on a compute node according to embodiments of the present invention.

For further explanation, FIG. 3A illustrates an exemplary Point To Point Adapter (180) useful in systems capable of optimizing JIT compiling for a Java application executing on a compute node according to embodiments of the present invention. Point To Point Adapter (180) is designed for use in a data communications network optimized for point to point operations, a network that organizes compute nodes in a three-dimensional torus or mesh. Point To Point Adapter (180) in the example of FIG. 3A provides data communication along an x-axis through four unidirectional data communications links, to and from the next node in the −x direction (182) and to and from the next node in the +x direction (181). Point To Point Adapter (180) also provides data communication along a y-axis through four unidirectional data communications links, to and from the next node in the −y direction (184) and to and from the next node in the +y direction (183). Point To Point Adapter (180) in FIG. 3A also provides data communication along a z-axis through four unidirectional data communications links, to and from the next node in the −z direction (186) and to and from the next node in the +z direction (185).

Figure 3B:
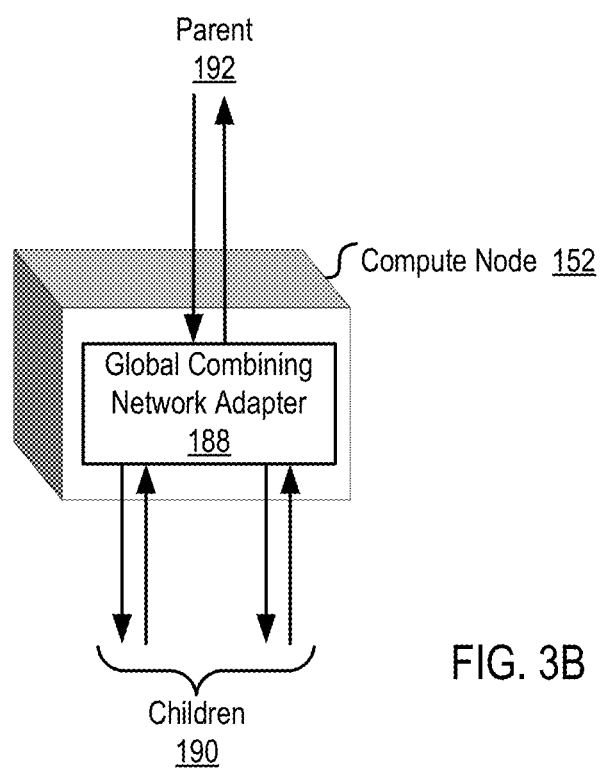
FIG. 3B illustrates an exemplary Global Combining Network Adapter useful in systems capable of optimizing JIT compiling for a Java application executing on a compute node according to embodiments of the present invention.

For further explanation, FIG. 3B illustrates an exemplary Global Combining Network Adapter (188) useful in systems capable of optimizing JIT compiling for a Java application executing on a compute node according to embodiments of the present invention. Global Combining Network Adapter (188) is designed for use in a network optimized for collective operations, a network that organizes compute nodes of a parallel computer in a binary tree. Global Combining Network Adapter (188) in the example of FIG. 3B provides data communication to and from two children nodes through four unidirectional data communications links (190). Global Combining Network Adapter (188) also provides data communication to and from a parent node through two unidirectional data communications links (192).

Figure 4:
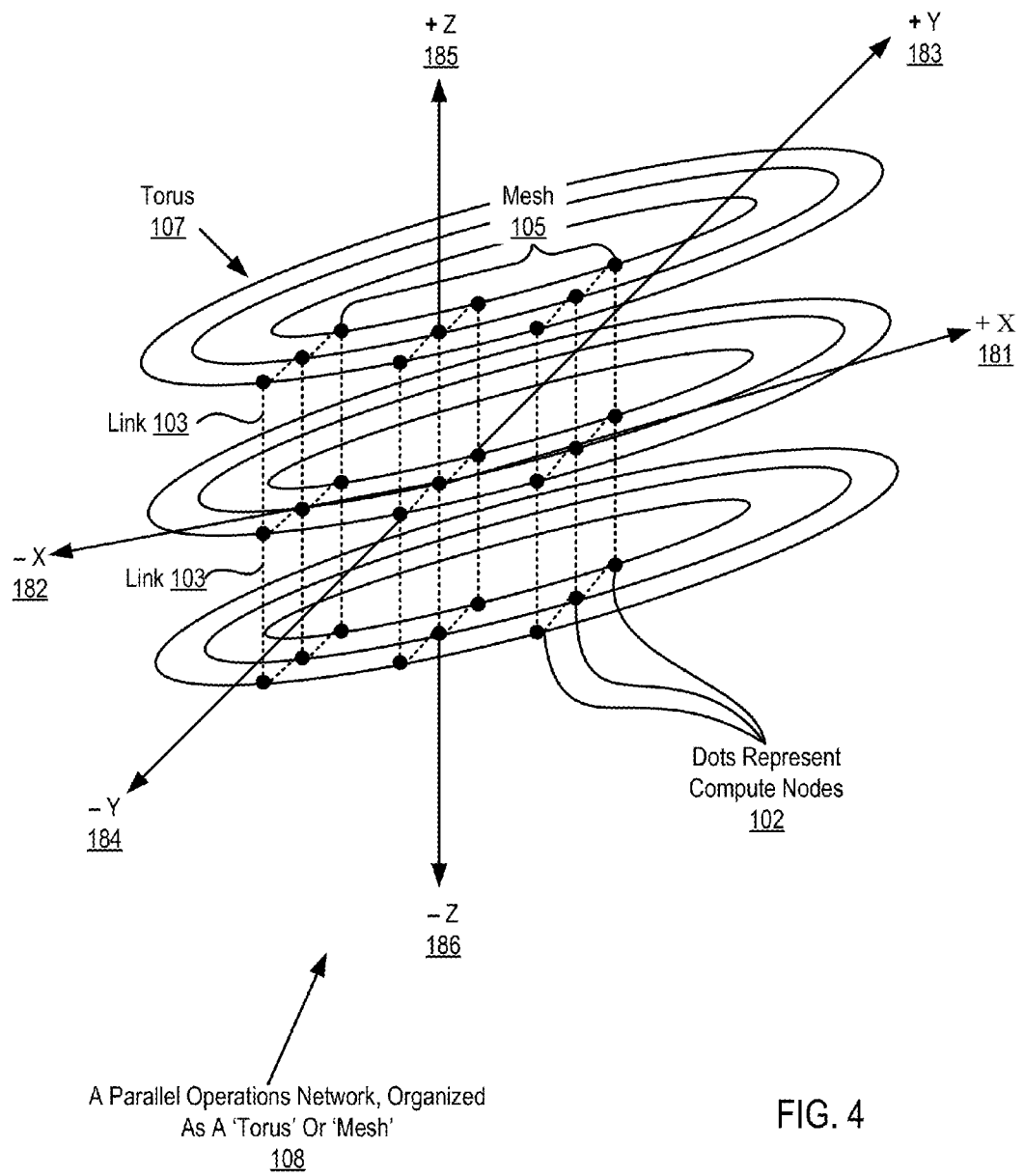
FIG. 4 sets forth a line drawing illustrating an exemplary data communications network optimized for point to point operations useful in systems capable of optimizing JIT compiling for a Java application executing on a compute node in accordance with embodiments of the present invention.

For further explanation, FIG. 4 sets forth a line drawing illustrating an exemplary data communications network (108) optimized for point to point operations useful in systems capable of optimizing JIT compiling for a Java application executing on a compute node in accordance with embodiments of the present invention. In the example of FIG. 4, dots represent compute nodes (102) of a parallel computer, and the dotted lines between the dots represent data communications links (103) between compute nodes. The data communications links are implemented with point to point data communications adapters similar to the one illustrated for example in FIG. 3A, with data communications links on three axes, x, y, and z, and to and fro in six directions +x (181), −x (182), +y (183), −y (184), +z (185), and −z (186). The links and compute nodes are organized by this data communications network optimized for point to point operations into a three dimensional mesh (105). The mesh (105) has wrap-around links on each axis that connect the outermost compute nodes in the mesh (105) on opposite sides of the mesh (105). These wrap-around links form part of a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point to point operations for use in optimizing JIT compiling for a Java application executing on a compute node in accordance with embodiments of the present invention may contain only a few compute nodes or may contain thousands of compute nodes.

Figure 5:
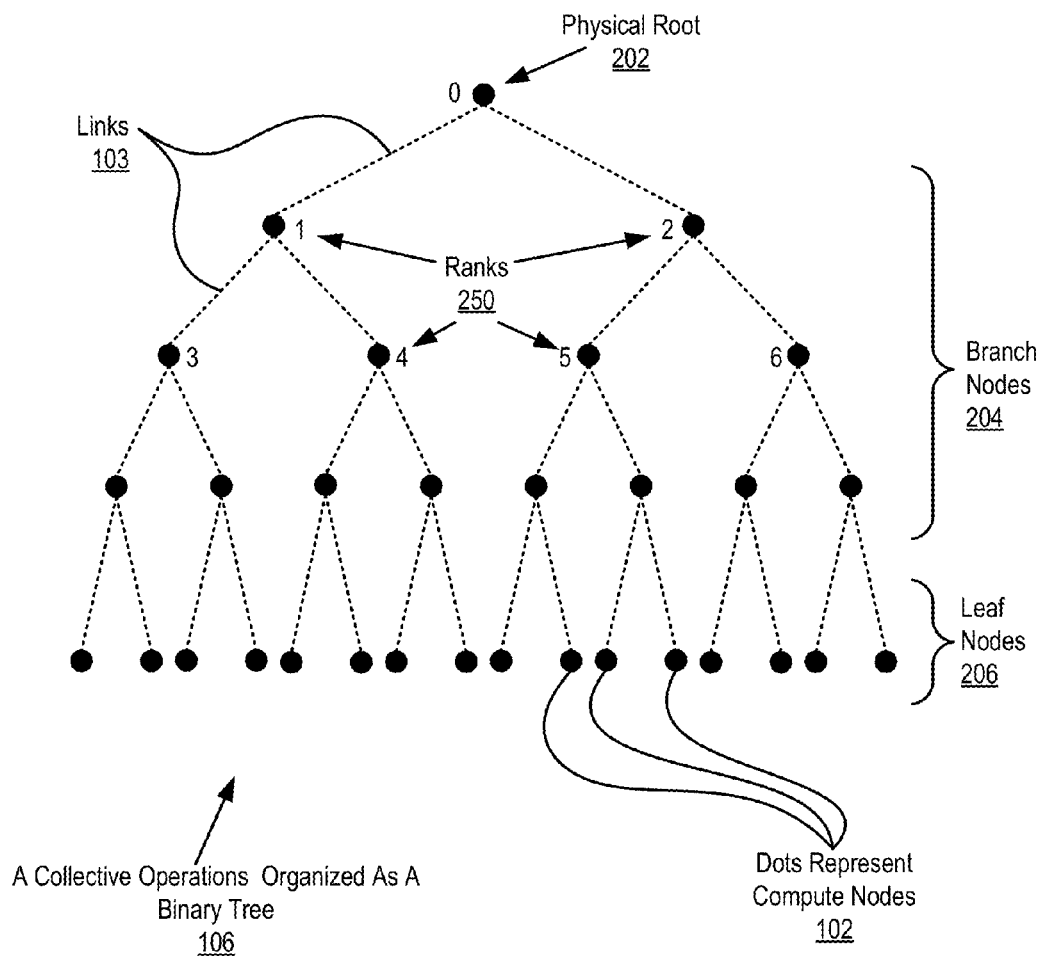
FIG. 5 sets forth a line drawing illustrating an exemplary data communications network optimized for collective operations useful in systems capable of optimizing JIT compiling for a Java application executing on a compute node in accordance with embodiments of the present invention.

For further explanation, FIG. 5 sets forth a line drawing illustrating an exemplary data communications network (106) optimized for collective operations useful in systems capable of optimizing JIT compiling for a Java application executing on a compute node in accordance with embodiments of the present invention. The example data communications network of FIG. 5 includes data communications links connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in a binary tree (106) may be characterized as a physical root node (202), branch nodes (204), and leaf nodes (206). The root node (202) has two children but no parent. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a data communications network optimized for collective operations for use in systems for optimizing JIT compiling for a Java application executing on a compute node in accordance with embodiments of the present invention may contain only a few compute nodes or may contain thousands of compute nodes.

In the example of FIG. 5, each node in the tree is assigned a unit identifier referred to as a 'rank' (250). A node's rank uniquely identifies the node's location in the tree network for use in both point to point and collective operations in the tree network. The ranks in this example are assigned as integers beginning with 0 assigned to the root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6:
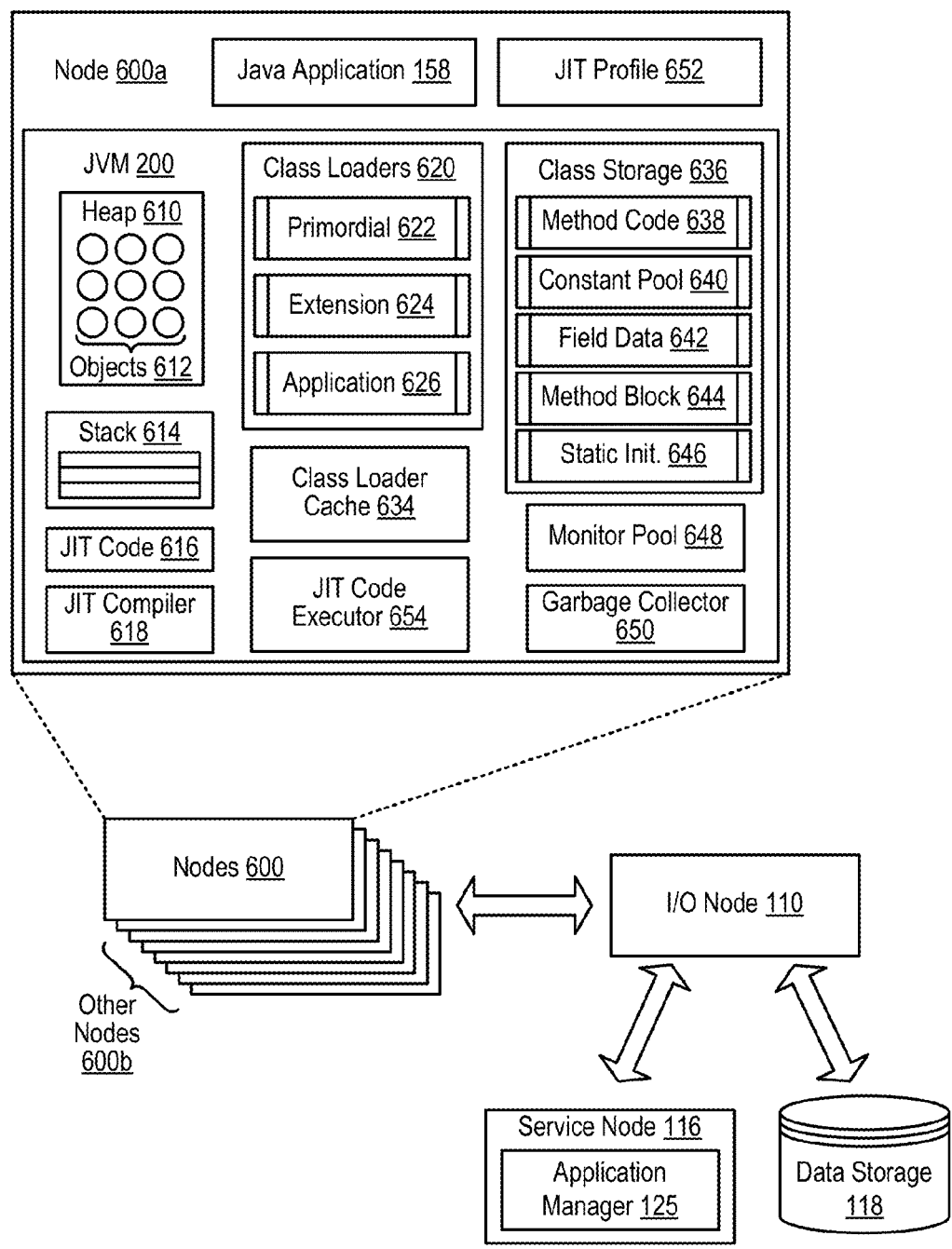
FIG. 6 sets forth a block diagram illustrating an exemplary system useful in optimizing JIT compiling for a Java application executing on a compute node according to embodiments of the present invention.

For further explanation, FIG. 6 sets forth a block diagram illustrating an exemplary system useful in optimizing JIT compiling for a Java application executing on a compute node (600a) according to embodiments of the present invention. The compute node (600a) is included in a parallel computer along with other compute nodes (600b). Each compute node (600) has installed upon it a JVM (200) capable of supporting a Java application (158).

The nodes (600) of FIG. 6 are connected together for data communications using a data communication network. In addition, the nodes (600) are connected to an I/O node (110) that provides I/O services between the nodes (600) and a set of I/O devices such as, for example, the service node (116) and the data storage (118). The service node (116) of FIG. 6 provides services common to nodes (600), administering the configuration of nodes (600), loading programs such as Java application (158) and JVM (200) onto the nodes (600), starting program execution on the nodes (600), retrieving results of program operations on the nodes (600), and so on. The data storage (118) of FIG. 6 may store the files that contain the Java classes that compose the Java application (158).

The service node (116) has installed upon it an application manager (125). The application manager (125) includes a set of computer program instructions capable of optimizing JIT compiling for a Java application executing on a compute node according to embodiments of the present invention. The application manager (125) operates generally for optimizing JIT compiling for a Java application executing on a compute node according to embodiments of the present invention by: identifying particular portion of the Java application (158) and assigning a JIT level to the particular portion of the Java application (158). In such a manner, optimizing JIT compiling for a Java application executing on a compute node according to embodiments of the present invention advantageously allows for different portions of a single application to be compiled and optimized using different JIT levels.

The level of granularity at which JIT levels are assigned to an application may vary depending on the implementation of the particular application portions to which the JIT levels are assigned. The particular portion of the Java application (158) may be implemented as a generic type of Java construct, a specific implementation of a Java construct, a call sequence for a particular Java method, and so on. A generic type of Java construct is a Java specific programming structure such as, for example, a class, a packet, a method, a Java Archive, and so on. A specific implementation of a Java construct is an actual instance of a generic type of Java construct. For example, foo( ) is an example of a specific implementation of a Java method. A call sequence for a particular Java method is the set of instructions in the execution path for a particular Java method from the method's beginning to the method's end. That is, call sequence for a particular Java method includes all of the computer program instructions in that particular method and any instructions of the methods invoked by that particular method.

Using these different exemplary application portions, the application manager (125) of FIG. 6 may assign a different JIT level to any one of these generic types of Java constructs, specific implementations of Java constructs, or call sequences for a particular Java method. For further explanation, consider that the application includes a Java Archive ('JAR') file that, in turn, includes a variety of Java classes. Consider that one of these Java classes is called 'foo_class,' and foo_class includes a method called 'foo_method,' which in turn calls a method named 'foo2_method.' Further consider that the JIT levels available to a particular JVM are 'low,' 'medium,' 'high,' and 'ultra high.' In such an example, the application manager (125) may assign a JIT level of low to the entire exemplary Java Archive, a JIT level of medium to foo_class, a JIT level of high to foo_method, and a JIT level of ultra high to foo2_method. In such a manner, different portion of the application has assigned different JIT levels.

In the example of FIG. 6, the application manager (125) assigns JIT levels to the various portions of application (158) in a JIT profile (652). The JIT profile (652) of FIG. 6 is a data structure used by the JVM (200) that associates a JIT level with a portion of the application (158). The JIT profile (652) may be formatted as a text file, a table, a structured document, or any other format as will occur to those of skill in the art. The application manager (125) may assign JIT levels to the various portions of application (158) in a JIT profile (652) based on user-specified JIT levels for the various portions of the application (158) or based on a historic execution performance for the various portions of the application (158).

The JVM (200) of FIG. 6 includes a storage area for just-in time ('JIT') code (616), equivalent to method byte code which has already been compiled into machine code to be run directly on the native platform. This code is created by the JVM (200) from Java byte code by a compilation and optimization process using JIT compiler (618), typically when the application program is started up or when some other usage criterion is met, and is used to improve run-time performance by avoiding the need for this code to be interpreted later.

The JIT compiler (618) of FIG. 6 operates generally for optimizing JIT compiling for a Java application executing on a compute node according to embodiments of the present invention by jitting each particular portion of the Java application (158) in dependence upon the JIT level assigned to that particular portion of the Java application. The JIT compiler (618) spawns a compilation thread that receives the byte-code version of the application (158), translates and optimizes the byte code into native code, and feeds the native code to an execution thread for the JIT code executor (654). After processing various portions of the application (158), the JIT compiler (618) examines the portions of the application (158) executed by the JIT code executor (654). The JIT compiler (618) may update the JIT profile (652) for the application (158) based on how the JIT code executor (654) executed the application (158). For example, if portions of the application are consistently being skipped during execution, the JIT compiler (618) may specify a JIT level in the JIT profile (652) for those skipped portions that instructs the JIT compiler (618) to skip compilation and optimization for those skipped portions. Similarly, if portions of the application are being executed repeatedly, the JIT compiler (618) may specify a JIT level in the JIT profile (652) for those repeatedly used portions that instruct the JIT compiler (618) to compile and fully optimization for those repeatedly used portions.

The Java application (158) included on the compute node (600a) is composed of any number of Java classes. In addition, the node (600a) of FIG. 6 includes a JVM (200) to provide a virtual execution environment for executing the Java application (158). As the JVM (200) executes the Java application (158), the JVM identifies a Java class utilized for the Java application (158). After the Java class is identified, the JVM (200) loads the Java classes for the application (158) into memory and prepare each class instance for execution. The JVM (200) therefore includes a hierarchy of class loaders (620) that operate to load the classes specified by the application (158). The hierarchy of class loaders (620) includes a primordial class loader (622), an extension class loader (624), and an application class loader (626).

The primordial class loader (622) of FIG. 6 loads the core Java libraries, such as 'core.jar,' 'server.jar,' and so on, in the '<JAVA HOME>/lib' directory. The primordial class loader (622), which is part of the core JVM, is written in native code specific to the hardware platform on which the JVM is installed. The extension class loader (624) of FIG. 6 loads the code in the extensions directories and is typically implemented by the 'sun.misc.Launcher$ExtClassLoader' class. The application class loader (626) of FIG. 6 loads the class specified by 'java.class.path,' which maps to the system 'CLASSPATH' variable. The application class loader (626) is typically implemented by the 'sun.misc.Launcher$AppClassLoader' class.

For each class included or specified by the Java application (158), the JVM (200) effectively traverses up the class loader hierarchy to determine whether any class loader has previously loaded the class. The order of traversal is as follows: first to the default application class loader (626), then to the extension class loader (624), and finally to the primordial class loader (622). If the response from all of the class loaders is negative, then the JVM (200) traverses down the hierarchy, with the primordial class loader first attempting to locate the class by searching the locations specified in its class path definition. If the primordial class loader (622) is unsuccessful, then the then the extension class loader (624) may make a similar attempt to load the class. If the extension class loader (624) is unsuccessful, then the application class loader (626) attempts to load the class. Finally, if the application class loader (626) is unsuccessful, then the JVM (200) triggers an error condition.

The JVM (200) of FIG. 6 also includes a heap (610), which is shared between all threads, and is used for storage of objects (612). Each object (612) represents an already loaded class. That is, each object (612) is in effect an instantiation of a class, which defines the object. Because an application (158) may utilize more than one object of the same type, a single class may be instantiated multiple times to create the objects specified by the application (158). Readers will note that the class loaders (620) are objects that are also stored on heap (610), but for the sake of clarity the class loaders (620) are shown separately in FIG. 6.

In the example of FIG. 6, the JVM (200) also includes a class storage area (636), which is used for storing information relating to the classes stored in the heap (610). The class storage area (636) includes a method code region (638) for storing byte code for implementing class method calls, and a constant pool (640) for storing strings and other constants associated with a class. The class storage area (636) also includes a field data region (642) for sharing static variables, which are shared between all instances of a class, and a static initialization area (646) for storing static initialization methods and other specialized methods separate from the method code region (638). The class storage area also includes a method block area (644), which is used to stored information relating to the code, such as invokers, and a pointer to the code, which may for example be in method code area (638), in JIT code area (616) described in detail below, or loaded as native code such as, for example, a dynamic link library ('DLL') written in C or C++.

A class stored as an object (612) in the heap (610) contains a reference to its associated data, such as method byte code, in class storage area (636). Each object (612) contains a reference to the class loader (620), which loaded the class into the heap (610), plus other fields such as a flag to indicate whether or not they have been initialized.

In the example of FIG. 6, the JVM (200) also includes a stack area (614), which is used for storing the stacks associated with the execution of different threads on the JVM (200). Readers will note that because the system libraries and indeed parts of the JVM (200) itself are written in Java, which frequently utilize multi-threading, the JVM (200) may be supporting multiple threads even if the Java application (158) contains only a single thread.

Also included within JVM (200) of FIG. 6 is a class loader cache (634) and garbage collector (650). The former is typically implemented as a table that allows a class loader to trace those classes which it initially loaded into the JVM (200). The class loader cache (634) therefore allows each class loader (620) to determine whether it has already loaded a particular class when the JVM (200) initially traverses the class loader hierarchy as described above. Readers will note that it is part of the overall security policy of the JVM (200) that classes will typically have different levels of permission within the system based on the identity of the class loader by which they were originally loaded.

The garbage collector (650) is used to delete objects (612) from heap (610) when they are no longer required. Thus in the Java programming language, applications do not need to specifically request or release memory, rather this is controlled by the JVM (200) itself. Therefore, when the Java application (158) specifies the creation of an object (612), the JVM (200) secures the requisite memory resource. Then, when the Java application finishes using object (612), the JVM (200) can delete the object (612) to free up this memory resource. This process of deleting an object is known as 'garbage collection,' and is generally performed by briefly interrupting all threads on the stack (614), and scanning the heap (610) for objects (612) which are no longer referenced, and therefore can be deleted. The details of garbage collection vary from one JVM (200) implementation to another, but typically garbage collection is scheduled when the heap (610) is nearly exhausted and so there is a need to free up space for new objects (612).

In the example of FIG. 6, the JVM (200) also includes a monitor pool (648). The monitor pool (648) is used to store a set of locks or 'monitors' that are used to control contention to an object resulting from concurrent attempts to access the object by different threads when exclusive access to the object is required.

Although the JVM (200) in FIG. 6 is shown on and described above with regard to the node (600a), readers will note that each of the other nodes (600b) also has installed upon it a JVM configured in a similar manner. That is, each of the other nodes (600b) also has installed upon it a JVM capable of optimizing JIT compiling for a Java application according to embodiments of the present invention.

Figure 7:
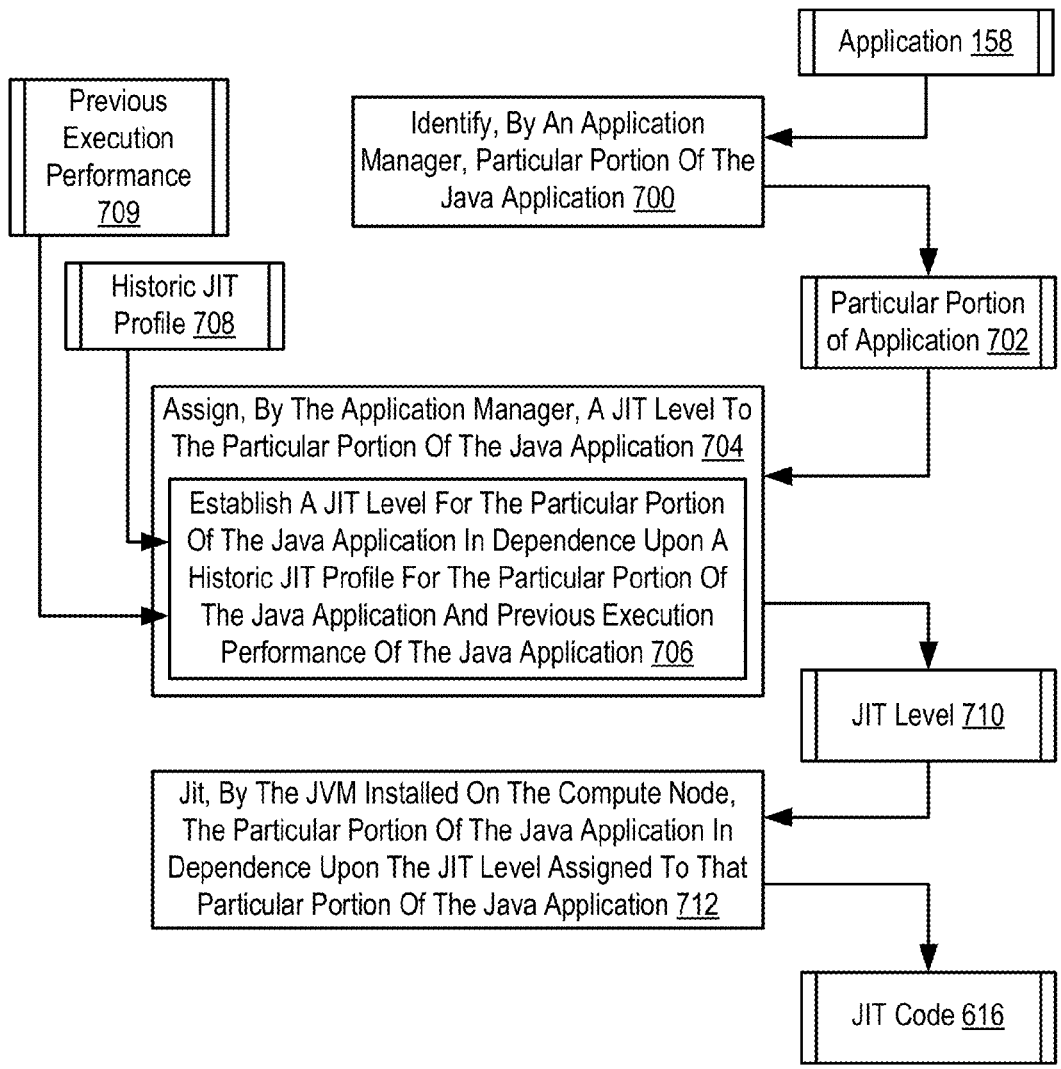
FIG. 7 sets forth a flow chart illustrating an exemplary method for optimizing JIT compiling for a Java application executing on a compute node according to embodiments of the present invention.

FIG. 7 sets forth a flow chart illustrating an exemplary method for optimizing JIT compiling for a Java application executing on a compute node according to embodiments of the present invention. The compute node described with reference to FIG. 7 has installed upon it a JVM capable of supporting the Java application (158). For discussion purposes for the remainder of the description with reference to FIG. 7, consider the following pseudo code representing an exemplary Java application:

```
01:        ...
02:        public class FooClass {
03:            static void foo2( ... ) {
04:                ...
05:                return;
06:            }
07:            static void foo( ... ) {
08:                ...
09:                FooClass.foo2( ... );
10:                ...
11:                return;
12:            ...
13:            public static void main (String[ ] args) {
14:                ...
15:                while (test) {
16:                    FooClass.foo( ... );
17:                }
18:                ...
19:                SomeOtherClass.someOtherMethod( ... );
20:                ...
21:            }
22:        }
23:        ...
```

The pseudo code above references three Java classes 'FooClass,' 'main,' and 'SomeOtherClass.' The main class invokes a member method of FooClass called 'foo' within a loop and a member method of SomeOtherClass called 'someOtherMethod.' In turn, the foo method invokes another member method of the FooClass called 'foo2.' Readers will note that the exemplary Java application represented by the pseudo code above is for explanation only and not for limitation.

The method of FIG. 7 includes identifying (700), by an application manager, particular portion (702) of the Java application (158). The application manager may be installed on the same compute node as the Java application (158) or the application manager may be installed on some other computer that accesses the Java application (158) through a data communications connection. The application manager may identify (700) the particular portion (702) of the Java application (158) according to the method of FIG. 7 by determining a specific application portion (702) to be identified and parsing the byte code representing the application (158) for the specific application portion to be identified. The specific application portion to be identified may be specified by a system administrator responsible for application JIT performance, or the specific application portion may be some preconfigured application portion. As mentioned above, the particular portions to be identified may include generic types of Java constructs, specific implementations of Java constructs, call sequences for particular Java methods, and so on. Accordingly, a system administrator may instruct the application manager to identify a particular generic Java construct type, specific implementation of a Java construct, or a specific call sequence for a particular Java method for assigning a JIT level.

For further explanation of identifying (700) a particular portion (702) of the Java application (158), consider again the exemplary pseudo code above representing an exemplary application. When the specific portion to be identified is a generic type of Java construct such as, for example, a Java class, the application manager may identify the following portions of the exemplary Java application:

TABLE 1

EXEMPLARY PORTIONS OF A JAVA APPLICATION

| PORTION IDENTIFIER | PORTION POSITION |
|---|---|
| Main | Lines 13-21 |
| FooClass | Lines 2-22 |

The exemplary table 1 above illustrates two Java classes identified by the application manager. The first portion is the Java class 'main' positioned at lines 13-21. The second portion is the Java class TooClass' positioned at lines 2-22. The positions are represented as lines number in the example above, but readers will note that the position may be represented in any number of ways as will occur to those of skill in the art including line numbers, memory locations, program counters, and so on. Readers will also note that exemplary application portions illustrated in table 1 are for explanation only and not for limitation.

For an additional example of identifying (700) a particular portion (702) of the Java application (158), consider again the exemplary pseudo code above representing an exemplary application. When the specific portion to be identified is a specific implementation of a Java construct such as, for example, the method 'foo,' the application manager may identify the following portions of the exemplary Java application:

TABLE 2

EXEMPLARY PORTIONS OF A JAVA APPLICATION

| PORTION IDENTIFIER | PORTION POSITION |
|---|---|
| foo | Lines 7-11 |

The exemplary table 2 above describes that the method 'foo' is positioned at lines 7-11 in the exemplary pseudo code above. Again, readers will note that exemplary application portions illustrated in table 2 are for explanation only and not for limitation.

For another example of identifying (700) a particular portion (702) of the Java application (158), consider again the exemplary pseudo code above representing an exemplary application. When the specific portion to be identified is a specific implementation of a Java construct such as, for example, the call sequence for the method 'foo,' the application manager may identify the following portions of the exemplary Java application:

TABLE 3

EXEMPLARY PORTIONS OF A JAVA APPLICATION

| PORTION IDENTIFIER | PORTION POSITION |
|---|---|
| foo | Lines 7-11 and Lines 3-6 |

The exemplary table 3 above describes that the call sequence for the method 'foo' includes computer program instructions positioned at lines 7-11 and lines 3-6 in the exemplary pseudo code above. Again, readers will note that exemplary application portions illustrated in table 3 are for explanation only and not for limitation.

The method of FIG. 7 includes assigning (704), by the application manager, a JIT level (710) to the particular portion (702) of the Java application (158). In the method of FIG. 7, the application manager assigns (704) a JIT level (710) to the particular portion (702) of the Java application (158) by establishing (706) the JIT level (710) for the particular portion (702) of the Java application (158) in dependence upon a historic JIT profile (708) for the particular portion (702) of the Java application (158). The historic JIT profile (708) of FIG. 7 represents a data structure used by the JVM that specifies JIT levels previously used when jitting various portions of the application (158). The previous execution performance (709) of FIG. 7 represents a data structure used by the JVM that specifies historic execution performance for the various portions of the application (158). Using the historic JIT profile (708) and the previous execution performance (709), the application manager may establish (706) the JIT level (710) for the particular portion (702) of the Java application (158) according to the method of FIG. 7 by determining whether a previous performance value for the particular portion (702) is below a performance threshold and whether the number of times the portion was invoked exceeds a repetition threshold, and incrementing the JIT level if the pervious performance value is below the performance threshold and the number of times the portion was invoked exceeds a repetition threshold.

For further explanation of assigning (704) a JIT level (710) to the particular portion (702) of the Java application (158), consider again the exemplary pseudo code above representing an exemplary application. Also consider that the previous execution performance for the various portions of the application is normalized on a scale of 1 to 10—being the lowest performance and 10 being the highest performance—and are as follows for the various portions of the application:

TABLE 4

EXEMPLARY PREVIOUS EXECUTION PERFORMANCE

| PORTION IDENTIFIER | PERFORMANCE VALUE | INVOCATION VALUE |
|---|---|---|
| FooClass | 2 | 1000 |
| foo2 | 3 | 1000 |
| foo | 1 | 1000 |
| main | 4 | 1 |
| SomeOtherClass | 9 | 1 |
| someOtherMethod | 10 | 1 |
| while construct | 1 | 1000 |
| Java Classes | 5 | 1001 |
| Java Methods | 4 | 2001 |
| Call Sequence foo | 1 | 1000 |

Table 4 above describes the previous execution performance of various portions of the exemplary application. The Java class FooClass exhibited relatively poor performance with a value of 2 and was invoked 1000 times. The Java method foo2 exhibited slightly better performance than the overall FooClass with a performance value of 3 and was invoked 1000 times. The Java method foo exhibited poor performance with a value of 1 and was also invoked 1000 times. The Java class main exhibited performance of 4 and was invoked only once. The Java class SomeOtherClass exhibited relatively high performance with a value of 9 and was invoked only once, and the Java method someOtherMethod also exhibited relatively high performance with a value of 10 and was invoked only once. The Java construct implemented as a while loop had relatively poor performance with a value of 1 and was invoked 1000 times. Overall, the Java Classes in the application had a performance value of 5 and were invoked 1001 times, and the Java methods overall had a performance value of 4 and were invoked 2001 times. The call sequence for the foo method, however, had a poor performance value of 1 and was invoked 1000 times. Readers will note that the table above is for example and explanation only and not for limitation.

Now consider an exemplary historical JIT profile for each of the portions in Table 4 where the JIT levels are low, medium, high, and ultra high for the various portions of the application:

TABLE 5

EXEMPLARY HISTORIC JIT PROFILE

| PORTION IDENTIFIER | JIT LEVEL |
|---|---|
| FooClass | Low |
| foo2 | Low |
| foo | Low |
| main | Medium |
| SomeOtherClass | Ultra High |
| someOtherMethod | Ultra High |
| while construct | Low |
| Java Classes | Medium |
| Java Methods | Medium |
| Call Sequence foo | Low |

Using the exemplary tables 4 and 5 above, the application manager may assign JIT levels to each of the portions of the exemplary application such that JIT level is increased for the application portions with poor previous execution performance but often invoked such as, for example, FooClass, foo2, foo, the while construct, and the call sequence for foo. The following table illustrates exemplary JIT level assigned by an application manager based on the exemplary historic JIT profile in table 4 and the exemplary previous execution performance of Table 5:

TABLE 6

EXEMPLARY JIT LEVELS

| PORTION IDENTIFIER | JIT LEVEL |
|---|---|
| FooClass | Ultra High |
| foo2 | Ultra High |
| foo | Ultra High |
| main | Medium |
| SomeOtherClass | Ultra High |
| someOtherMethod | Ultra High |
| while construct | Ultra High |
| Java Classes | Medium |
| Java Methods | Medium |
| Call Sequence foo | Ultra High |

From Table 6 above, readers will note that the JIT levels for exemplary application portions FooClass, foo2, foo, the while construct, and the call sequence for foo have all been increased from 'low' to 'ultra high' because their previous execution performance was poor and these portions of the application were often invoked. Again, readers will note that the examples above are for explanation only and not for limitation.

Although assigning (704) a JIT level (710) to the particular portion (702) is described above based on historic JIT profile (708), readers will note that in some other embodiments, the application manager may assign (704) a JIT level (710) to the particular portion (702) of the Java application (158) based on predictive application performance for the various portions of the application (158). Still further, in some other embodiments, the application manager may assign (704) a JIT level (710) to the particular portion (702) of the Java application (158) based on predefined JIT levels for the various portions of the application (158) provided by a system administrator or an application developer.

The method of FIG. 7 also includes jitting (712), by the JVM installed on the compute node, the particular portion (702) of the Java application (158) in dependence upon the JIT level (710) assigned to that particular portion (702) of the Java application (158). The JVM may jit (712) the particular portion (702) of the Java application (158) in dependence upon the JIT level (710) assigned to that particular portion (702) according to the method of FIG. 7 by setting the JVM jit mode to the JIT level assigned to the particular portion (702) upon encountering that particular portion (702) of the application (158), translating and optimizing the byte code representations of that portion (702) into JIT code (616), and providing the JIT code (616) to the JVM's execution thread for execution on the processor of the compute node. Readers will note that the level of optimization performed on the various portions of the application (158) vary according to the JIT level assigned to those portions. In such a manner, usage of the JVM's jitting resources can enhanced because portions of the application that do not benefit from high levels of optimization can be assigned low JIT levels and other portions that will benefit from optimization can be assigned high JIT levels. Moreover, optimizing JIT compiling for a Java application executing on a compute node according to embodiments of the present invention allows a system administrator or application developer having knowledge of other relevant computing factors to assign low JIT levels to portions of applications where initialization and startup time should be minimized despite the fact that those portions will benefit from higher levels of optimization associated with higher JIT levels.

Exemplary embodiments of the present invention are described largely in the context of a fully functional computer system for optimizing JIT compiling for a Java application executing on a compute node. Readers of skill in the art will recognize, however, that the present invention also may be embodied in a computer program product disposed on computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of optimizing just-in-time ('JIT') compiling for a software application executing on a compute node, the compute node having installed upon it a software Virtual Machine ('VM') capable of supporting the software application, the method comprising:

identifying a plurality of portions within the software application;

for each portion of the plurality of portions, assigning, by an application manager, one of a plurality of a JIT levels to the portion of the software application, wherein the plurality of JIT levels excludes a level in which no JIT compiling is carried out, including:

establishing the JIT level for the portion of the software application in dependence upon both a historic JIT profile for the portion of the software application specifying, for each previous execution, one of a plurality of JIT levels previously used when jitting the portion of the software application and previous execution performance of the portion of the software application including a previous performance value and a number of times the particular portion was invoked; wherein each portion of the plurality of portions of the application is assigned a different JIT level; and jitting, by the VM installed on the compute node, the portion of the software application in dependence upon the JIT level assigned to that portion of the software application.

2. The method of claim 1 wherein the portion of the software application further comprises a generic type of software construct.

3. The method of claim 1 wherein the portion of the software application further comprises a specific implementation of a software construct.

4. The method of claim 1 wherein the portion of the software application further comprises a software call sequence for a particular software method.

5. The method of claim 1 wherein optimizing JIT compiling for a software application executing on a compute node further comprises optimizing JIT compiling for a software application executing on a parallel computer, the parallel computer comprising a plurality of compute nodes and a service node, the application manager installed upon the service node, the plurality of compute nodes connected for data communications through a plurality of data communications networks, at least one data communications network optimized for collective operations, and at least one other data communications network optimized for point to point operations.

* * * * *